US009223698B2

(12) United States Patent
Tal

(10) Patent No.: US 9,223,698 B2
(45) Date of Patent: Dec. 29, 2015

(54) SSD-BLOCK ALIGNED WRITES

(71) Applicant: Kaminario Technologies Ltd., Yokne'am ILIT (IL)

(72) Inventor: Doron Tal, Haifa (IL)

(73) Assignee: Kaminario Technologies Ltd., Yokne'am Ilit (IL)

( * ) Notice: Subject to any disclaimer, the term of this patent is extended or adjusted under 35 U.S.C. 154(b) by 165 days.

(21) Appl. No.: 14/156,035

(22) Filed: Jan. 15, 2014

(65) Prior Publication Data

US 2014/0201429 A1 Jul. 17, 2014

Related U.S. Application Data

(60) Provisional application No. 61/752,644, filed on Jan. 15, 2013.

(51) Int. Cl.
G06F 12/00 (2006.01)
G06F 12/02 (2006.01)

(52) U.S. Cl.
CPC .... *G06F 12/0246* (2013.01); *G06F 2212/7202* (2013.01); *Y02B 60/1225* (2013.01)

(58) Field of Classification Search
CPC ............... G06F 12/0246; G06F 2212/7202; Y02B 60/1225
See application file for complete search history.

(56) References Cited

U.S. PATENT DOCUMENTS

| 2007/0255890 | A1* | 11/2007 | Urata | G06F 12/0246 711/103 |
| 2010/0223422 | A1* | 9/2010 | Bonella | G06F 13/405 711/103 |
| 2012/0030409 | A1* | 2/2012 | Post | G06F 12/0246 711/103 |

* cited by examiner

*Primary Examiner* — John Lane
(74) *Attorney, Agent, or Firm* — Wiggin and Dana LLP; Gregory S. Rosenblatt

(57) ABSTRACT

An SSD, comprising a mapping module and a controller, mapping module is capable of mapping a plurality of SSD-block aligned groups, each comprises a specific sequence of LBAs, to SSD blocks. The controller is capable of determining whether a LBA referenced in an incoming write request is a first LBA in a respective group, and if so, the controller is capable of: opening an ongoing SSD-block aligned write session; assigning a SSD block to the session; and recording in the session's data an indication of which LBA is associated with the write data that was saved to the SSD. In case the LBA referenced in the incoming write request is not the first LBA in the respective group, but is a successor of a latest-saved LBA of the group, storing the write data in sequence with a latest used segment of the SSD-block that was assigned to the group.

24 Claims, 5 Drawing Sheets

SSD-BLOCK ALIGNED WRITES

CROSS-REFERENCE TO RELATED APPLICATION

The present application claims the benefit of the filing date of U.S. Provisional Patent Application No. 61/752,644 filed Jan. 15, 2013, the disclosure of which is hereby incorporated herein by reference.

TECHNOLOGICAL FIELD

The present invention is in the field of data storage and relates to managing data writes in a solid state drive.

BACKGROUND

SSD storage device can include a plurality of storage elements in which erasable segments are larger than the writable segments. For example, this may be the case in a NAND Flash where data can be erased in blocks and can be written in pages, and any block consists of several pages. This type of storage configuration may experience performance degradation resulting from blocks with only partly valid data.
General Description
Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on an intangible computer readable medium and executable by various processors, and any combination thereof. A specific component of the presently disclosed subject matter can be formed by one particular segment of software code, or by a plurality of segments, which can be joined together and collectively act or behave according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component(s) can be embodied in operational data or operational data can be used by a presently disclosed component(s). By way of example, such operational data can be stored on tangible computer readable medium. The operational data can be a single data set, or it can be an aggregation of data stored at different locations, on different network nodes or on different storage devices.

According to an aspect of the presently disclosed subject matter there is provided a method of managing a SSD, comprising: partitioning a logical block address space in alignment with the SSD's blocks, giving rise to a plurality of SSD-block aligned groups, each group comprising a specific sequence of logical block addresses; determining whether a logical block address referenced in an incoming write request is a first logical block in a respective SSD-block aligned group, and if so:
opening an ongoing SSD-block aligned write session;
assigning a SSD block to the session; and
recording in the session's data an indication of which logical block address is associated with the write data that was saved to the SSD.
According to an example of the presently disclosed subject matter there is further provided a method, further in response to determining that the logical block address is the first logical block in the group, storing respective write data in a first segment of the SSD block that was assigned to the respective ongoing SSD-block aligned write session.

According to an example of the presently disclosed subject matter there is yet further provided a method, wherein the ongoing SSD-block aligned write session further includes an offset parameter which indicates how many logical block addresses from the respective block aligned group were written so-far to the SSD block that was assigned to the session.

According to an example of the presently disclosed subject matter there is yet further provided a method, wherein in case the logical block address referenced in the incoming write request is not the first logical block in the respective SSD-block aligned group, determining whether the logical block address is a successor of a latest-saved logical block address of the group, and if so, storing the write data in a SSD block that was assigned to the respective group, in sequence with a latest used segment of the SSD-block.

According to an example of the presently disclosed subject matter there is yet further provided a method, wherein in case the logical block address referenced in the incoming write request is not the first logical block in the respective SSD-block aligned group, determining whether the logical block address is a successor of a latest saved logical block address of the group, and if so, storing the write data in a SSD block that was assigned to the respective group, in sequence with a last used segment of the SSD-block, and incrementing the offset parameter.

According to an example of the presently disclosed subject matter there is yet further provided a method, wherein when write data that is associated with an entire SSD-block aligned group is stored in the SSD-block, terminating the respective ongoing SSD-block aligned write session.

According to an example of the presently disclosed subject matter there is yet further provided a method, wherein the ongoing SSD-block aligned write session further includes a free flag, and wherein when the session is opened the free flag is set to false, and when the session is terminated resetting the free flag to true.

According to an example of the presently disclosed subject matter there is yet further provided a method, wherein when following terminating an ongoing SSD-block aligned write session that was associated with a certain SSD-block aligned group, a write request logical block address that is the first logical block in the same SSD-block aligned group is received at the SSD, performing:
opening a new ongoing write session;
assigning a new SSD block to the new session; and
recording the logical block address and the newly assigned SSD block in the new session's data.
According to an example of the presently disclosed subject matter there is yet further provided a method, wherein in case it is determined that the logical block address referenced in the incoming write request is not the first logical block in the respective SSD-block aligned group, and is not the successor of the current last-saved logical block address of the group:
storing respective write data in a protected write buffer;
acknowledging the write request; and
determining, after a timeout period, whether the logical block address referenced in the write request that is associated with the write data that was stored in the protected write buffer is now the successor of the current latest-saved logical block address of the group.
According to an example of the presently disclosed subject matter there is yet further provided a method, wherein in case it is determined that the logical block address referenced in the incoming write request is not the first logical block in the respective SSD-block aligned group, and is not the successor of the current last-saved logical block address of the group, storing respective write data in a SSD block that is reserved for out-of-sequence writes.

According to an example of the presently disclosed subject matter there is yet further provided a method, wherein in case it is determined that logical block address referenced in the incoming write request is mapped to one or more bad pages in the SSD-block assigned to the write session, storing respective write data in a SSD block that is reserved for out-of-sequence writes.

According to an aspect of the presently disclosed subject matter there is yet further provided an SSD, comprising:
   a mapping module capable of mapping each one of a plurality SSD-block aligned groups to a respective SSD block from a respective plurality of SSD blocks, wherein a SSD-block aligned group comprises a specific sequence of logical block addresses;
   a controller capable of determining whether a logical block address referenced in an incoming write request is a first logical block in a respective SSD-block aligned group, and if so, the controller is capable of:
   opening an ongoing write session;
   assigning a SSD block to the session; and
   recording in the session's data an indication of which logical block address is associated with the write data that was saved to the SSD.

According to an example of the presently disclosed subject matter there is yet further provided an SSD, wherein further in response to determining that the logical block address is the first logical block in the group, the controller is configured to store respective write data in a first segment of the SSD block that was assigned to the respective ongoing SSD-block aligned write session.

According to an example of the presently disclosed subject matter there is yet further provided an SSD, wherein the controller is further capable of recording in the session's data an offset parameter which indicates how many logical block addresses from the respective block aligned group were written so-far to the SSD block that was assigned to the session.

According to an example of the presently disclosed subject matter there is yet further provided an SSD, wherein in case the logical block address referenced in the incoming write request is not the first logical block in the respective SSD-block aligned group, the controller is capable of determining whether the logical block address is a successor of a latest-saved logical block address of the group, and if so, the controller is capable of storing the write data in a SSD block that was assigned to the respective group, in sequence with a latest used segment of the SSD-block.

According to an example of the presently disclosed subject matter there is yet further provided an SSD, wherein in case the logical block address referenced in the incoming write request is not the first logical block in the respective SSD-block aligned group, the controller is capable of determining whether the logical block address is a successor of a latest saved logical block address of the group, and if so, the controller is capable of storing the write data in a SSD block that was assigned to the respective group, in sequence with a last used segment of the SSD-block, and the controller is further capable of incrementing the offset parameter.

According to an example of the presently disclosed subject matter there is yet further provided an SSD, wherein when write data that is associated with an entire SSD-block aligned group is stored in the SSD-block, the controller is capable of terminating the respective ongoing SSD-block aligned write session.

According to an example of the presently disclosed subject matter there is yet further provided an SSD, wherein the controller is capable of including in the ongoing SSD-block aligned write session's data a free flag, and wherein when the session is opened the controller is configured to set the free flag to a false state, and when the session is terminated the controller is configured to reset the state of the free flag to true.

According to an example of the presently disclosed subject matter there is yet further provided an SSD, wherein when following terminating an ongoing SSD-block aligned write session that was associated with a certain SSD-block aligned group, a write request referencing a logical block address that is the first logical block in the same SSD-block aligned group is received at the SSD, the controller is capable of:
   opening a new ongoing write session;
   assigning a new SSD block to the new session; and
   recording the logical block address and the newly assigned SSD block in the new session's data.

According to an example of the presently disclosed subject matter there is yet further provided an SSD, wherein in case it is determined that the logical block address referenced in the incoming write request is not the first logical block in the respective SSD-block aligned group, and is not the successor of the current last-saved logical block address of the group, the controller is capable of:
   storing respective write data in a protected write buffer;
   acknowledging the write request; and
   determining, after a timeout period, whether the logical block address referenced in the write request that is associated with the write data that was stored in the protected write buffer is now the successor of the current latest-saved logical block address of the group.

According to an example of the presently disclosed subject matter there is yet further provided an SSD, wherein in case the controller determines that the logical block address referenced in the incoming write request is not the first logical block in the respective SSD-block aligned group, and is not the successor of the current last-saved logical block address of the group, the controller is capable of storing respective write data in an SSD block that is reserved for out-of-sequence writes.

According to an example of the presently disclosed subject matter there is yet further provided an SSD, wherein in case the controller determines that logical block address referenced in the incoming write request is mapped to one or more bad pages in the SSD-block assigned to the write session, the control is capable of storing respective write data in a SSD block that is reserved for out-of-sequence writes.

According to an aspect of the presently disclosed subject matter there is yet further provided a program storage device readable by machine, tangibly embodying a program of instructions executable by the machine to perform a method of managing a SSD, comprising:
   partitioning a logical block address space in alignment with the SSD's blocks, giving rise to a plurality of SSD-block aligned groups, each group comprises a specific sequence of logical block addresses;
   determining whether a logical block address referenced in an incoming write request is a first logical block in a respective SSD-block aligned group, and if so:
   opening an ongoing SSD-block aligned write session;
   assigning a SSD block to the session; and
   recording in the session's data an indication of which logical block address is associated with the write data that was saved to the SSD.

According to an aspect of the presently disclosed subject matter there is yet further provided a computer program product comprising a computer useable medium having computer readable program code embodied therein of managing a SSD, the computer program product comprising:

computer readable program code for causing the computer to partition a logical block address space in alignment with the SSD's blocks, giving rise to a plurality of SSD-block aligned groups, each group comprises a specific sequence of logical block addresses;

computer readable program code for causing the computer to determine whether a logical block address referenced in an incoming write request is a first logical block in a respective SSD-block aligned group, and if so:

computer readable program code for causing the computer to open an ongoing SSD-block aligned write session;

computer readable program code for causing the computer to assign a SSD block to the session; and computer readable program code for causing the computer to record in the session's data an indication of which logical block address is associated with the write data that was saved to the SSD.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
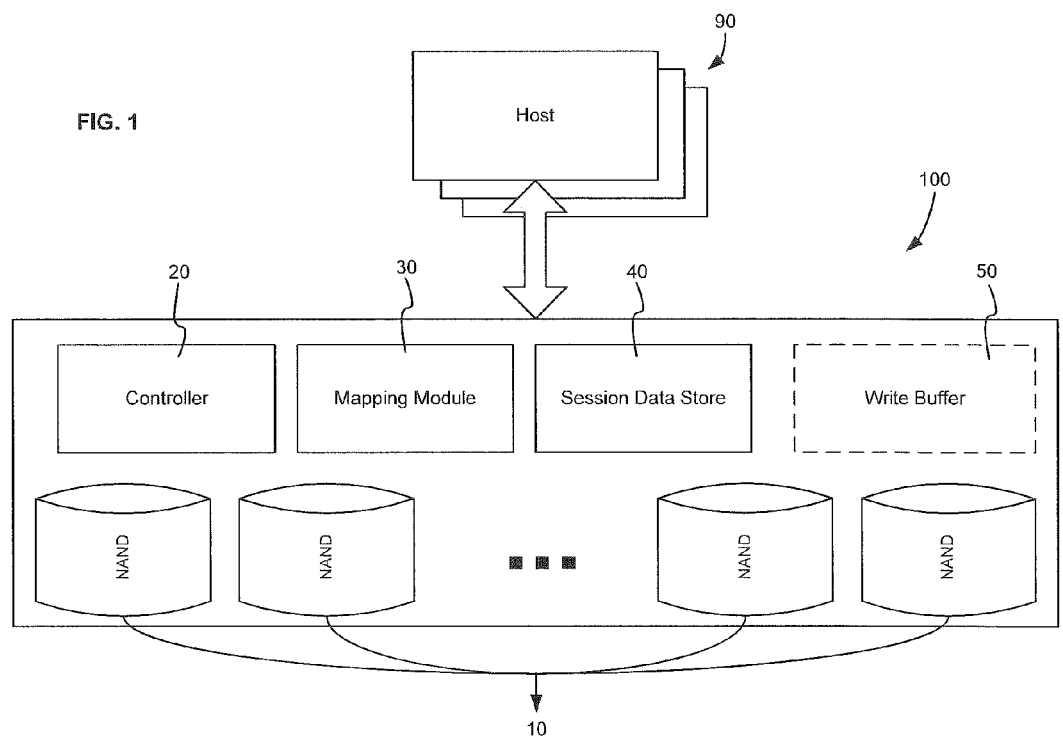
FIG. 1 is a is a block diagram illustration of a SSD device, according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures and components have not been described in detail so as not to obscure the presently disclosed subject matter.

Unless specifically stated otherwise, as apparent from the following discussions, it is appreciated that throughout the specification discussions various functional terms refer to the action and/or processes of a computer or computing device, or similar electronic computing device, that manipulate and/or transform data represented as physical, such as electronic, quantities within the computing device's registers and/or memories into other data similarly represented as physical quantities within the computing device's memories, registers or other such tangible information storage, transmission or display devices.

Throughout the description, reference is made to the term "logical unit volume" or "LU volume" in abbreviation. The term LU volume (or logical unit volume) is known in the art of digital storage, and the following definition is provided as a non-limiting example only for convenience purposes. Accordingly, unless stated otherwise, the interpretation of the term LU volume, should not be construed to be limited by the definitions below and the term LU volume should be given its broadest reasonable interpretation. The term LU volume as used herein relates to a logical unit created by a volume create request or an equivalent request. For example, in the SCSI storage protocol, an LU volume is created by such a volume create request.

The term "logical block address" or "LBA" in abbreviation as used herein, relates to the basic reference unit which is used by external hosts to address IO requests to the storage system. LBAs can be numerical and range from 1-n. A partly or an entirely overlapping LBA range (e.g., 1-n) can be used with multiple, different volumes (e.g., all the volumes) in the storage system, and therefore in order to reference a specific logical block, a reference to the volume with which the logical block is associated may be required. For simplicity, in the description of examples of the presently disclosed subject matter the IO requests reference LBA and the existence of multiple volumes in the storage system is not mentioned. It would be appreciated, that this omission is made with the intention of simplifying the description of the examples of the presently disclosed subject matter, and is not intended to limit the scope of the description. Therefore, it would be appreciated that examples of the presently disclosed subject matter encompass a multi-volume storage system and that the LBAs which are referred to herein can be comprised of a combination of an LBA and a volume ID (e.g., LU number).

It should be appreciated that the above addressing scheme is merely one possible implementation of an addressing scheme and is used herein by way of example only, and in further examples of the presently disclosed subject matter, different addressing schemes may be used. For example, in a different addressing scheme, each volume in the storage system can be associated with a different range of LBAs, and in such a case there is no need to reference the volume ID when referring to LBAs.

Reference is initially made to FIG. 1 which is a block diagram illustration of a SSD device, according to examples of the presently disclosed subject matter. According to examples of the presently disclosed subject matter, a SSD device 100 can include a plurality of NAND elements 10 which are used for storing data in the SSD device 100. For convenience, and by way of non-limiting example, the SSD device 100 is referred to herein as a Flash memory. Furthermore, the reference to NAND elements is also made by way of example, and further examples of the presently disclosed subject matter can be applied to any SSD in which data the erasable segments are significantly larger than the writable segments, such as in a NAND Flash wherein data can be erased in blocks and can be written in pages, where any block consists of several pages. Further by way of example, in NAND Flash, the process of erasing a block is considered to be costly in terms of power consumption, duration and endurance (there is a relatively small number of times that such a process can be carried out for any specific block).

According to examples of the presently disclosed subject matter, the SSD device 100 can also include a controller 20, and a mapping module 30. According to examples of the presently disclosed subject matter, the mapping module 30 can be capable of mapping each one of a plurality of LBAs to a respective SSD-block aligned group from a plurality of SSD-block aligned groups. Furthermore, according to examples of the presently disclosed subject matter, each SSD-block aligned group is associated with a specific sequence of LBAs, which is also recorded in the mapping module 30.

As mentioned above, the SSD device 100 can be erased in block-wise segments and written in page-wise segments, and each SSD block corresponds to several (two, three, . . . , n) SSD pages. According to examples of the presently disclosed subject matter, each SSD-page can correspond in size to one or more LBAs (one, two, . . . , n). It would be noted then, that according to examples of the presently disclosed subject matter, the number of LBAs in a SSD-block aligned group, is associated with the number of SSD-pages in a SSD-block. For convenience, and by way of non-limiting example, it is assumed in the following description that there is a 1:1 correspondence between LBAs and SSD-pages. Accordingly, in the following description, the terms "LBA" or "LBAs" and the terms "SSD-page" or "SSD-pages" are sometimes used interchangeably.

According to examples of the presently disclosed subject matter, the controller 20 can process incoming 10s, which are received, for example, from hosts 90. Further according to examples of the presently disclosed subject matter, the controller 20 can be configured to manage writes to the SSD device 100, such that SSD-block aligned writes are increased. Still further according to examples of the presently disclosed subject matter, the controller 20 can be configured to manage a single write at a time, or the controller 20 can be configured to manage several write streams concurrently.

In some examples, the controller 20 can be configured to break down each incoming write request (with a given LBA and length) to page size segments. The controller 20 can be configured to determine whether a first LBA-size segment of write data in a certain write request corresponds to a certain LBA in the sequence of LBAs which are associated with a respective SSD-block aligned group (the first, second, . . . , $n^{th}$ LBA in the sequence). It would be appreciated that in an implementation where there is a 1:1 correspondence between LBAs and SSD-pages, the controller 20 can instead examine whether the first page size segment in the write request corresponds to the desired LBA in the respective SSD-block aligned group.

Figure 3:
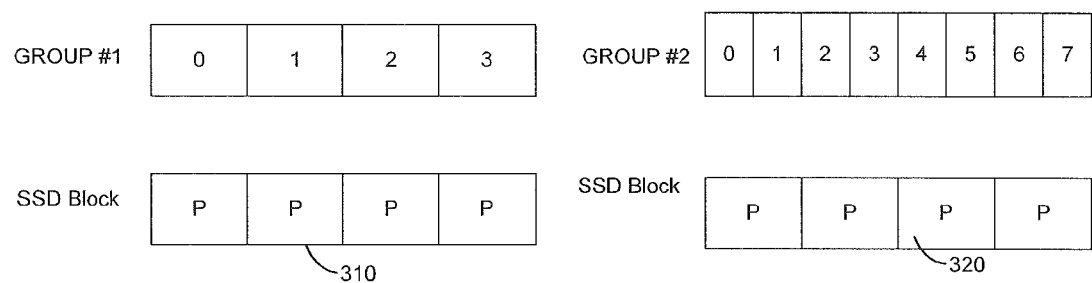
FIG. 3 is a graphical illustration of two SSD-block aligned groups, each being associated with a different sequence of four LBAs.

In FIG. 3, to which reference is now made, there are shown by way of example, two SSD-block aligned groups, each being associated with a different sequence of LBAs: GROUP#1 is associated with LBAs 0-3 and GROUP#2 is associated with LBAs 0-7. Also shown in FIG. 3 by way of example, are two SSD-blocks 310 and 320. The SSD-block aligned group GROUP#1 is aligned to SSD block 310 and the SSD-block aligned group GROUP#2 is aligned to SSD block 320. With reference to SSD block 310, there is a 1:1 correspondence between the LBAs and SSD-pages, whereas with reference to SSD block 320, there is a 2:1 correspondence between the LBAs and SSD-pages. Both implementations, as well as numerous other implementations are within the scope of examples of the presently disclosed subject matter.

Accordance to examples of the presently disclosed subject matter, in case the write data in a certain write request corresponds to segments which are associated with more than one SSD-block aligned group, the controller 20 can be configured to process each SSD-block related segment separately, in association with the respective SSD-block aligned group. For convenience and by way of non-limiting example, the description below refers to the processing of an incoming write request which is associated with a single SSD-block aligned group. However, those versed in the art can readily apply the teaching provided herein to the case of incoming write requests that reference segments which are associated with more than one SSD-block aligned group, as explained above.

According to examples of the presently disclosed subject matter, the controller 20 can be further configured to write, update, and erase session data which relates to ongoing SSD-block aligned write sessions. In further examples of the presently disclosed subject matter, the SSD device 100 includes a session data store 40 where ongoing SSD-block aligned write sessions data is stored. As mentioned above, the controller 20 operates with the session data store 40 to maintain updated data with respect to ongoing SSD-block aligned write sessions data.

Figure 2:
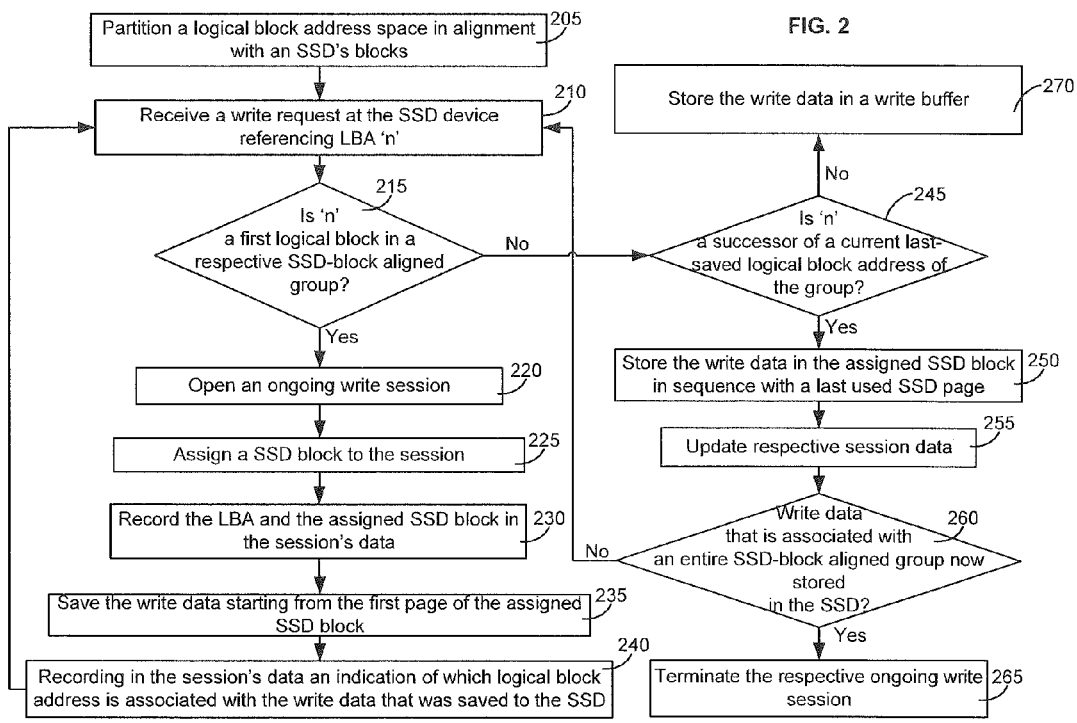
FIG. 2 is a flowchart illustration of an example of operations of managing a SSD, according to examples of the presently disclosed subject matter.

Reference is now additionally made to FIG. 2, which is a flowchart illustration of a method of managing a SSD, according to examples of the presently disclosed subject matter. According to examples of the presently disclosed subject matter, a logical block address space can be partitioned in alignment with an SSD's blocks (block 205). This is the process in which the plurality of SSD-block aligned groups are created, where each group is comprised of a specific sequence of LBAs.

At some point, a write request can be received at the SSD device, referencing a certain LBA (block 210). For convenience, reference will be made to the LBA that is referenced by the write request as LBA 'n'. Responsive to receiving the write request at the SSD, it can be determined whether the LBA referenced in the write request is a first LBA in a respective SSD-block aligned group (block 215).

By way of example, in block 215 a condition expression can be used to determine whether the condition is met:

$n$ % Erase block size=0  Condition (1)

It would be noted that Condition (1) is appropriate for some grouping schemes, but as part of examples of the presently disclosed subject other schemes can be used to group the LBAs to SSD-block aligned groups, and different processing steps can be implemented to determine whether the LBA referenced in a write request corresponds to the first LBA in a respective SSD-block aligned group.

As mentioned above, according to examples of the presently disclosed subject matter, the controller 20 can be responsible for processing an incoming write request to determine if the LBA referenced in the write request is the first LBA in a respective SSD-block aligned group, and the controller 20 can be configured to consult the mapping module 30 in which LBA sequences are mapped to SSD-block aligned groups to find out if the LBA is the first LBA in a group's sequence or not.

As was mentioned above, if more than one LBA is referenced in the write request, but the LBAs all belong to the same SSD-block aligned group, the process in FIG. 2 is implemented with respect to the first LBA in the group (e.g., the LBA with the smallest number). The process from block 215 can be repeated for each LBA according to the sequence of the LBAs in the respective group. In further examples of the presently disclosed subject matter, the process can be adapted and starting from the second LBA, the process can commence from block 245, which will be described below.

As was mentioned above, according to examples of the presently disclosed subject matter, in case the write request includes write data that is associated with LBAs that belong to more than one SSD-block aligned group, the write request is divided to several different write requests, each write request involves write data that is associated with LBA(s) that belong to just one SSD-block aligned group, and the process from block 215 and onwards is implemented with respect to one of the divided write requests separately.

Returning now to the description of FIG. 2, in case it is determined at block 215 that the LBA referenced in the write request is the first LBA in the respective SSD-block aligned group, the operation illustrated by blocks 220-240 can be implemented. According to examples of the presently disclosed subject matter, in case it is determined at block 215 that the LBA referenced in the write request is the first LBA in the respective SSD-block aligned group, an ongoing write session can be opened and initiated (block 220). By way of example, the controller 20 can be configured to create a new data structure or to allocate or assign resources to an existing data structure, e.g., in the session data store 40, for session data associated with the new ongoing SSD-block aligned write.

Further in response to determining that the LBA referenced in the write request is the first LBA in the respective SSD-block aligned group, a SSD-block can be assigned to the new ongoing SSD-block aligned write session (block 225). By way of example, the controller 30 can include or can be associated with an allocation table (or any other data structure—not shown), and can be configured to determine which SSD-block can be allocated for the new session. SSD-block provisioning and allocation are well known aspects of SSD device management, and any suitable method of managing the provisioning and/or allocation of SSD-blocks, including any necessary components, can be implemented in the SSD device 100 according to examples of the presently disclosed subject matter.

For the first LBA of a SSD-block aligned group for which a SSD-block was assigned and a session was opened, the controller can be configured to store a reference to the LBA (in this case it is the first LBA) for which write data was stored in the SSD-block that was assigned to the session, and a reference to the SSD-block which was assigned to the session (block 230). In addition to opening the session and storing the session data therein, the write data from the write request which referenced the first LBA can be stored starting from the first page of the SSD-block which was assigned to the respective session (block 235), and an indication that write data was stored in the allocated SSD-block for the first LBA can be stored as part of the session data. It would be appreciated that the operations associated with blocks 230-240 can be carried out in any order, including simultaneously.

It would be appreciated that according to examples of the presently disclosed subject matter, the session data can be organized in many forms and formats. Some of the session data can be essential for implementing the method or the device according to examples of the presently disclosed subject matter, whereas other types of session data are optional. Furthermore, some data types can be derived from data that is stored as part of the session data. For example, the identity of the SSD-block aligned group with which certain session data is associated can be derived from the LBA that is stored as part of the session data.

According to examples of the presently disclosed subject matter, as part of the session data for an ongoing SSD-block aligned write, the following data items can be stored (or can be derived from other stored session data items):

a reference to the SSD-block which was assigned to the session;

a reference to the SSD-block aligned group that is associated with the session; and an indication indicating for which LBAs from the group write data was stored in the SSD-block that was assigned to the session.

There is now provided an example according to the present disclosure of one possible format of the session data.

TABLE 1

| Is free | LBA | Block # | Offset |
|---------|-----|---------|--------|
| Yes     |     |         |        |
| Yes     |     |         |        |

Table (1) provides an example of the type of session data that can be held in the SSD device 100. By way of example, the session data can include a reference to the first LBA of the SSD-block aligned group with which the session is associated, a reference for the SSD-block which was allocated for storing the write data from write requests which are processed as part of the ongoing write session, and a offset parameter which indicates which is the next LBA in the respective group's sequence for which the write data is to be stored in the allocated SSD-block. Optionally, a free flag can also be used to determine whether a certain session in the table is free and can be overwritten. The free flag will be turned to the "is free" state when write data for all the LBAs in the group was stored in the SSD-block which was assigned for that session, and the session is terminated.

Notably, in some examples of the presently disclosed subject matter, the session data store 40 can have a limited capacity, and thus, the SSD device 100 can be capable of supporting a finite number (two, three, . . . , n) of ongoing SSD-block aligned write sessions. Thus, according to examples of the presently disclosed subject matter, in case there is an attempt to open a session (at block 220), but the session data store 40 does not have available resources to allocate for storing the session's data, the controller 20 can implement a waiting period, and retry to open the new session after the waiting period lapses. The waiting period can be implemented recurrently until resources on the session data store 40 or until a timeout period is reached. It would be appreciated that in cases where a timeout period is reached, before the controller succeeds to open a new session, the controller can be configured to send an error indication to the host 90. In such cases the host 90 can be configured to retry the write request. In another example of the presently disclosed subject matter, when a predefined number (e.g., one, two, three, . . . , or n) waiting periods lapsed and a timeout period is reached, the controller 20 can be configured to store the write data which cannot be processed as a SSD-block aligned write in a write buffer 50, as will be further discussed below.

Returning now to the description of FIG. 2, in case it is determined at block 215 that the LBA referenced in an incoming write request is not the first LBA in the respective SSD-block aligned group, the process can proceed to block 245, where it is determined if the LBA referenced in the write request is a successor (according to the sequence of LBAs in the respective SSD-block aligned group) of the latest LBA from the same group for which data was stored in the SSD-block that was allocated for the group, or not.

For example, according to examples of the presently disclosed subject matter, as mentioned above, for each SSD-block aligned group for which there is an open SSD-block aligned write session, the session data store 40 can hold the respective ongoing SSD-block aligned write session data, and as part of the session data, there is an indication which is the next LBA in the respective group's sequence for which the write data is to be stored in the allocated SSD-block. The group association of this session data can be obtained directly from the session data, in case such data is stored in the session data, or it can be determined from a reference to a member of the group (an LBA) which is stored as part of the sessions data. This indication regarding the next LBA for which data is to be stored in the SSD-block that was allocated for the respective group can be can be used to determine if an LBA is a successor of an LBA for which the write data is the latest that was saved in the SSD-block that was assigned to the respective session.

For example, in case Table 1 is used for storing the sessions data, Condition (2) can be used to determine whether an LBA that is referenced in an incoming write request is a successor of the latest LBA from the same group for which data was stored in the SSD-block that was allocated for the group, $$\text{Base\_LBA} + \text{offset} == \text{LBA} \quad \text{Condition(2)}$$

where 'Base_LBA' is the first LBA in the sequence of LBAs included in the SSD-block aligned group, and 'offset' is the offset from the 'Base_LBA' to the LBA following the latest LBA from the same group for which data was stored in the SSD-block that was allocated for the group (i.e., the offset to the successor of the latest LBA from the same group for which data was stored in the SSD-block).

If it is determined at block 245 that the LBA referenced in the write request is a successor of the latest LBA from the same group for which data was stored in the SSD-block that was assigned to the respective ongoing SSD-block aligned write session (the session that is associated with the group in which the LBA referenced in the write request is a member), the write data from the write request can be stored in sequence with the last used SSD-page of the allocated SSD-block (block 250). Thus, the write data is sequentially stored in the SSD-block according to the order of the LBAs in the SSD-block aligned group.

At block 255, the ongoing SSD-block aligned write session's data is updated to reflect the writing of the write data from the write request in the SSD-block which was assigned to the session. For example, in case the SSD-block aligned write session's data is stored in the SSD 100 in the format of table (1), the offset parameter is updated.

According to examples of the presently disclosed subject matter, after the write data from the write request in the SSD-block (block 250) and following the session data update (block 255), the controller 20 can be configured to check if the write data for the entire SSD-aligned group is now stored in the allocated SSD-block (block 260). It would be appreciated, that according to examples of the presently disclosed subject matter, this condition is met after the write data which is associated with the last LBA in the sequence of LBAs which are included in the SSD-block aligned group is stored in the allocated SSD-block.

According to examples of the presently disclosed subject matter, if at block 260 it is determined that the write data for the entire SSD-aligned group is now stored in the allocated SSD-block, the respective ongoing SSD-block aligned write session can be terminated (block 265). By way of example, in case the SSD-block aligned write session's data is stored in the SSD 100 in the format of table (1), terminating the session can involve switching the state of the 'is free' flag to 'true', and allowing a new session to overwrite the terminated session.

It would be appreciated if a new write request is received at the SSD, which references the first LBA of the group that is associated with a session which has just been terminated, this will cause a new session to be opened, and possibly a different SSD-block to be allocated for the new session. The handling of the previous version of the write data that is associated with the LBAs from the same group, which is stored in the SSD device, is outside the scope of this disclosure. Various methods and techniques for managing a SSD, including a garbage collection method, can be implemented for releasing the SSD-blocks that hold stale data.

Returning now to the description of FIG. 2, if at block 260 it is determined that there is at least one more LBA in the SSD-aligned group for which write data is not yet stored in the allocated SSD-block, the controller 20 can be configured to keep the session open and wait for a write request which references an LBA which is a successor (according to the sequence of LBAs in the respective group) of an LBA for which the write data is the latest that was saved in the SSD-block that was assigned to the respective session.

So far, the operations discussed involved operations which can be implemented according to examples of the presently disclosed subject matter, such as in case that at block 245 it was determined that the write request referenced an LBA which is a successor (according to the sequence of LBAs in the respective group) of an LBA for which the write data is the latest that was saved in the SSD-block that was assigned to the respective session. However, according to examples of the presently disclosed subject matter, if it is determined at block 245 that the write request referenced an LBA which is not a successor, the controller cannot implement the SSD-block aligned write operations described above. There are several optional operations which can be implemented according to examples of the presently disclosed subject matter, in case it is determined at block 245 that the write request referenced an LBA which is not a successor, as described below.

According to examples of the presently disclosed subject matter, the SSD device 100 can include a write buffer 50, where the write data from a write request that references a LBA which is not in sequence with the last LBA from the same group for which data was stored in the SSD-block that was allocated to the session with which this group is associated can be stored (block 270). In other words, the write buffer can be used to store the write data of a write request for which the response in blocks 215 and 245 is 'NO". According to examples of the presently disclosed subject matter, the controller can monitor the state of the sessions' data, to determine when the write data in the write buffer 50 is in sequence with a latest LBA from the same group for which data was stored in the SSD-block that was allocated to the session with which this group is associated, and then store it in the allocated SSD-block in sequence with the existing data. It would be appreciated, that the controller 20 can be configured to acknowledge the write request, even when the data is kept in the write buffer 50, until it is ready for writing in the primary storage area.

According to yet a further example, storage resources on one or more of the NAND elements 10 can be allocated for storing write data which is not aligned to the SSD-blocks. The storage resource which is allocated for storing write data which is not aligned to the SSD-blocks can be used to store the write data of a write request for which the response in blocks 215 and 245 is 'NO, i.e., the resources can be used for storing write data from a write request that references a LBA which is not in sequence with the latest LBA from the same group for which data was stored in the SSD-block that was allocated to the session with which this group is associated. This sort of storage technique is commonplace in many commercially available Flash NAND devices and any suitable technology can be used to manage resources which are allocated to such not-aligned to SSD block writes. It would be appreciated that the controller 20 can be configured to acknowledge the write request after the write data is stored in the resources which are allocated for storing write data which is not aligned to the SSD-blocks.

In some examples of the presently disclosed subject matter, the host 90 can be or can include a storage controller, which maintains an indirection map per LBA. The storage controller used by the host can be configured to process the data that is to be written to the SSD-device (e.g., pending writes) such that the write requests from the host 90 are aligned with the SSD-block aligned groups and in compliance with the sequence of LBAs in each group. By way of example, the host 90 can pad write requests, use a buffer and/or any other means to support writing to the SSD 100 in a way which is compatible (at least to a high degree or to a degree which is above a certain threshold/ratio out of the total writes to the SSD 100) with the methods described herein, for example, in a manner which is compatible with the method shown in FIG. 2 and described herein with reference to FIG. 2.

There is now provided a description of a scenario of an implementation of a method of managing a SSD according to examples of the presently disclosed subject matter. It should be appreciated that the description provided below is a non-limiting example and is intended for purposes of illustration.

Figure 4:
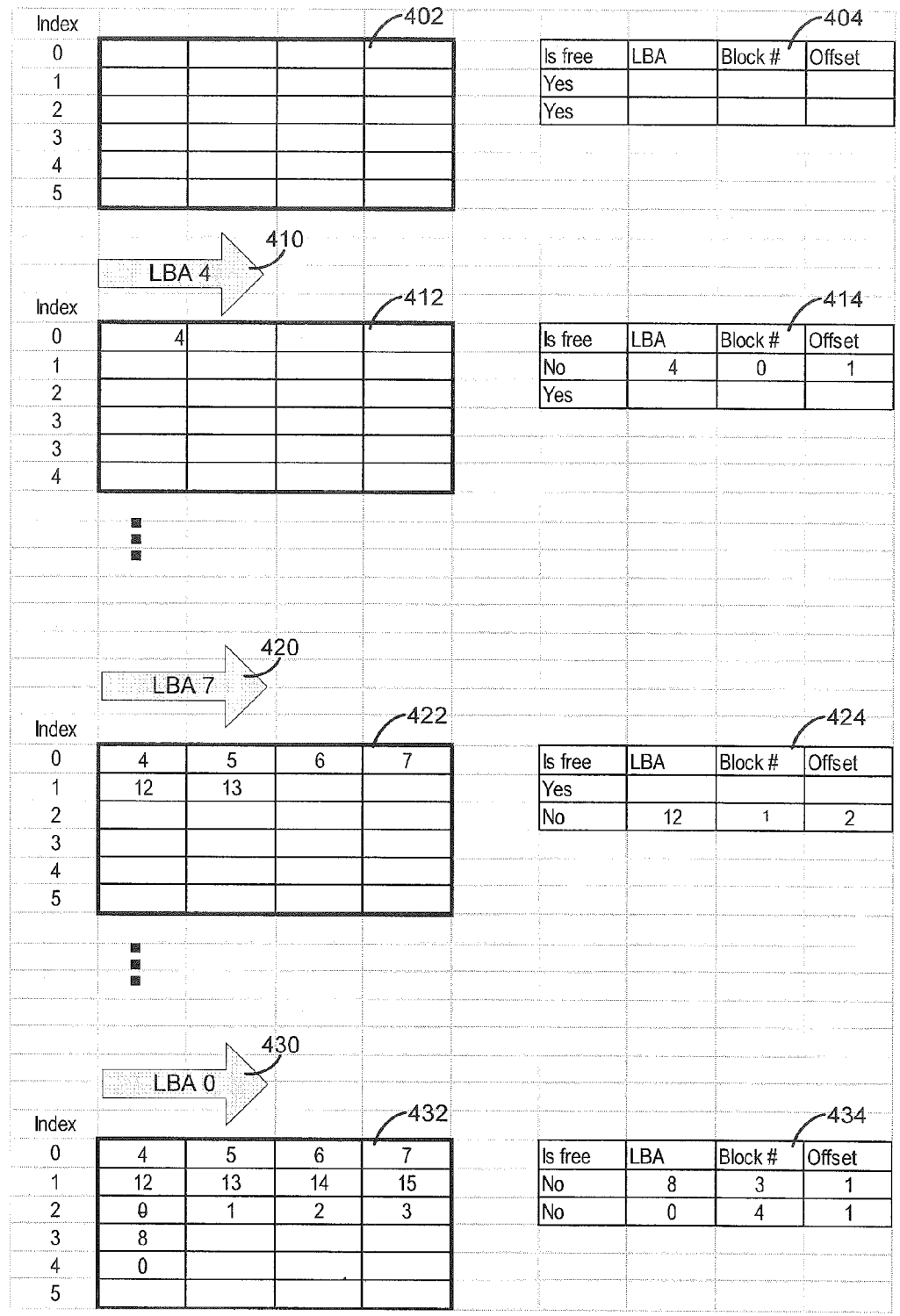
FIG. 4 is a graphical illustration of different states of a NAND element and corresponding states of an ongoing SSD-block aligned session table under a certain scenario, according to examples of the presently disclosed subject matter.
Figure 4:
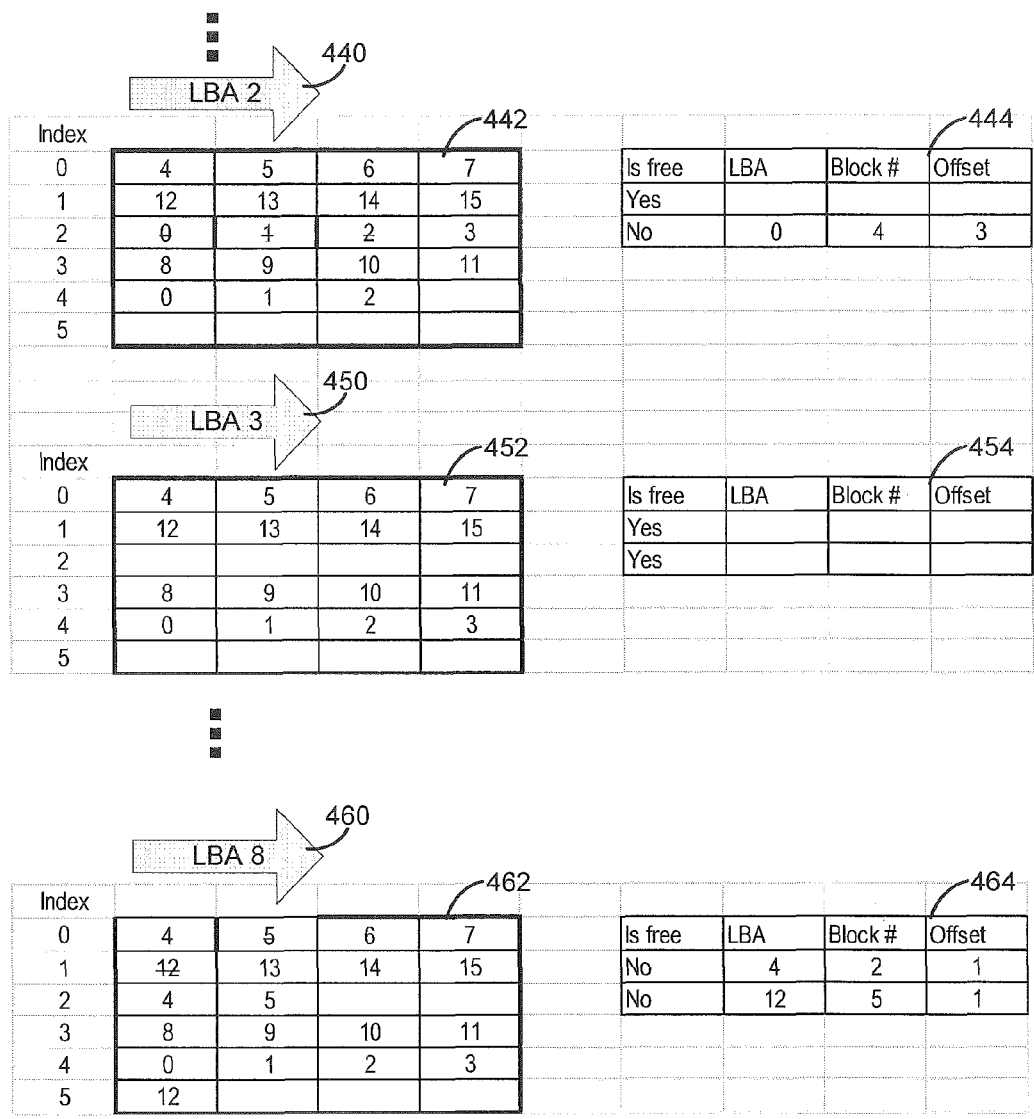

Referring now to FIG. 4, there is shown a graphical illustration of different states of a NAND element and corresponding states of an ongoing SSD-block aligned session table under a certain scenario, according to examples of the presently disclosed subject matter. The numeral 402 references a NAND element in an initial state. Each cell represents a SSD cell and each row represents a SSD-block. The numeral 404 references an ongoing SSD-block aligned session table in an initial state. Arrow 410 represents a write request which references LBA 4. LBA is the first LBA in a SSD-block aligned group, and so a new session is opened in response to the receipt of write request 410 and a SSD-block (the one reference with the index '0') is allocated for the new session. The table state 414 is updated: the 'is free' flag is set to 'No'; a reference is added to the first LBA of the respective SSD-block aligned group (this parameter also indicates with which group the session is associated); the index of the allocation SSD block, in this case '0', is recoded; and an offset parameter is set to '1' indicating that the next write request which is expected for the group should reference the second LBA in the sequence of LBAs that are included in the group. The write data that was included in the write request 410 is stored in the first page of the SSD block indexed '0'.

Some time after write request 410 is processed, a write request 420 referencing LBA 7 is received at the SSD device. LBA 7 is the last in the sequence of LBAs that are included in the respective SSD-block aligned group, and the write data from the write request, is stored in the last page of the SSD-block, in succession to the write data from previous write requests which referenced the previous LBAs from the respective group, as the state of the NAND element 422 indicates. Since the writing of the write data that is associated with LBA 7 complete a sequence of write data that is aligned with the SSD-block which was allocated to the respective ongoing SSD-block aligned write session, the session can be terminated. Thus, in the table state 424 in the row that was used for storing the data for the terminated session, the 'is free' flag is set to 'yes' and the rest of the data can be deleted or marked as invalid, so that it can be overwritten.

Some time after write request 420 is processed, a write request 430 referencing LBA 0 is received at the SSD device. In state 432 of the NAND element the block indexed '2' holds a previous version of the group which includes LBA '0'. Since LBA '0' is the first LBA of the group, the write request referencing LBA '0' requires a new SSD-block allocation, and the opening of a new SSD-block aligned write session. In state 432 of the NAND element the SSD-block indexed 4 is allocated and the write data that is associated with LBA '0' is stored in the first page of the allocated SSD-block. The previous version of LBA '0', which is in this case the data that is stored in the first page of the SSD-block indexed '2' becomes invalid, and various methods and techniques can be implemented to handle the management of different versions of the same data in a SSD, as would be known to those versed in the art. It would be appreciated that, at state 432, the rest of the data that is stored in the SSD-block indexed '2' remains valid. A new row is added to the table for the SSD group that includes LBA '0' in response to the write request 430, as depicted by table state 434.

Write requests 440 and 450 which reference LBAs 2 and 3 respectively, are received and processed to complete yet another sequence of write data that is aligned with the SSD-block which was allocated to the respective ongoing SSD-block aligned write session, and in response to which the respective session is terminated as indicated by table states 444 and 454. The NAND elements states 442 and 452 indicate the completion of the write data sequence which puts it in alignment with the SSD-block that was allocated to the session.

Some time after write requests 440 and 450 are processed, a write request 460 referencing LBA '8' is received at the SSD device. When write request 460 is received the NAND element is full, as indicated in state 462, since all the SSD-blocks are allocated to active sessions. Therefore, write request 460 cannot be served. In this regard, it would be appreciated that the SSD-block indexed '3' cannot be allocated to the a new session, because even if the data stored in the first page of SSD-block indexed '3' become invalid (it is an older version of the data that is associated with LBA '8'), the rest of the block still holds valid data and it cannot be erased.

In addition, LBA '8' is the first block of a SSD-block aligned group. As mentioned above, a write request which references the first block of a SSD-block aligned group, may require opening of a new session (and allocation of a SSD-block). However, as can be seen in state 464 of the table, the table resources are fully allocated to previous sessions, and there are no free resources for opening new sessions.

In both cases, i.e., SSD is full and table resources are fully allocated, a waiting period can be implemented after which it can be determined if at least one SSD-block and table resources become available. As was also mentioned above, storage resources on one or more of the NAND elements 10 can be allocated for storing write data which is not aligned to the SSD-blocks. If such storage resources exist, they can be used for storing write data, in case of SSD-block aligned write overflows, for example, when the SSD resources that are allocated for storing SSD-block aligned writes are full and/or when SSD is full and the resources that used for storing ongoing SSD-block aligned write sessions are fully allocated.

According to one example, storage resources on one or more of the NAND elements 10 can be allocated for storing write data of a write request in an SSD-block aligned write session, which references an LBA range mapped to a respective SSD-block assigned to the write session, which comprises one or more bad pages to which data cannot be written. LBA range assigned to the bad pages can be written (e.g., by controller 20), in out-of-sequence writes to specifically allocated storage resources. This technique enables to overcome the mismatch between the write session length and the SSD-block size and to avoid overflow of the latter and thus to continue with SSD-block aligned write sessions notwithstanding an SSD-block with one or more bad pages.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method of managing a SSD, comprising:
    partitioning a logical block address space in alignment with the SSD's blocks, giving rise to a plurality of SSD-block aligned groups, each group comprises a specific sequence of logical block addresses;
    determining whether a logical block address referenced in an incoming write request is a first logical block in a respective SSD-block aligned group, and if so:
        opening an ongoing SSD-block aligned write session;
        assigning a SSD block to the session; and
        recording in the session's data an indication of which logical block address is associated with the write data that was saved to the SSD.

2. The method according to claim 1, further in response to determining that the logical block address is the first logical block in the group, storing respective write data in a first segment of the SSD block that was assigned to the respective ongoing SSD-block aligned write session.

3. The method according to claim 1, wherein the ongoing SSD-block aligned write session further includes an offset parameter which indicates how many logical block addresses from the respective block aligned group were written so-far to the SSD block that was assigned to the session.

4. The method according to claim 3, wherein in case the logical block address referenced in the incoming write request is not the first logical block in the respective SSD-block aligned group, determining whether the logical block address is a successor of a latest saved logical block address of the group, and if so, storing the write data in a SSD block that was assigned to the respective group, in sequence with a latest used segment of the SSD-block, and incrementing the offset parameter.

5. The method according to claim 2, wherein in case the logical block address referenced in the incoming write request is not the first logical block in the respective SSD-block aligned group, determining whether the logical block address is a successor of a latest-saved logical block address of the group, and if so, storing the write data in a SSD block that was assigned to the respective group, in sequence with a latest used segment of the SSD-block.

6. The method according to claim 5, wherein when write data that is associated with an entire SSD-block aligned group is stored in the SSD-block, terminating the respective ongoing SSD-block aligned write session.

7. The method according to claim 6, wherein when following terminating an ongoing SSD-block aligned write session that was associated with a certain SSD-block aligned group, a write request referencing a logical block address that is the first logical block in the same SSD-block aligned group is received at the SSD:
    opening a new ongoing write session;
    assigning a new SSD block to the new session; and
    recording the logical block address and the newly assigned SSD block in the new session's data.

8. The method according to claim 5, wherein the ongoing SSD-block aligned write session further includes a free flag, and wherein when the session is opened the free flag is set to false, and when the session is terminated resetting the free flag to true.

9. The method according to claim 5, wherein in case it is determined that the logical block address referenced in the incoming write request is not the first logical block in the respective SSD-block aligned group, and is not the successor of the current last-saved logical block address of the group:
    storing respective write data in a protected write buffer;
    acknowledging the write request; and
    determining, after a timeout period, whether the logical block address referenced in the write request that is associated with the write data that was stored in the protected write buffer is now the successor of the current latest-saved logical block address of the group.

10. The method according to claim 5, wherein in case it is determined that the logical block address referenced in the incoming write request is not the first logical block in the respective SSD-block aligned group, and is not the successor of the current last-saved logical block address of the group, storing respective write data in a SSD block that is reserved for out-of-sequence writes.

11. The method according to claim 5, wherein in case it is determined that logical block address referenced in the incoming write request is mapped to one or more bad pages in the SSD-block assigned to the write session, storing respective write data in a SSD block that is reserved for out-of-sequence writes.

12. A SSD, comprising:
    a mapping module capable of mapping each one of a plurality SSD-block aligned groups to a respective SSD block from a respective plurality of SSD blocks, wherein a SSD-block aligned group comprises a specific sequence of logical block addresses;
    a controller capable of determining whether a logical block address referenced in an incoming write request is a first logical block in a respective SSD-block aligned group, and if it is, the controller is capable of:
        opening an ongoing write session;
        assigning a SSD block to the session; and
        recording in the session's data an indication of which logical block address is associated with the write data that was saved to the SSD.

13. The SSD according to claim 12, wherein further in response to determining that the logical block address is the first logical block in the group, the controller is configured to store respective write data in a first segment of the SSD block that was assigned to the respective ongoing SSD-block aligned write session.

14. The SSD according to claim 13, wherein in case the logical block address referenced in the incoming write request is not the first logical block in the respective SSD-block aligned group, the controller is capable of determining whether the logical block address is a successor of a latest-saved logical block address of the group, and if it is, the controller is capable of storing the write data in a SSD block that was assigned to the respective group, in sequence with a latest used segment of the SSD-block.

15. The SSD according to claim 14, wherein when write data that is associated with an entire SSD-block aligned group is stored in the SSD-block, the controller is capable of terminating the respective ongoing SSD-block aligned write session.

16. The SSD according to claim 14, wherein the controller is capable of including in the ongoing SSD-block aligned write session's data a free flag, and wherein when the session is opened the controller is configured to set the free flag to a false state, and when the session is terminated the controller is configured to reset the state of the free flag to true.

17. The SSD according to claim 16, wherein when following terminating an ongoing SSD-block aligned write session that was associated with a certain SSD-block aligned group, a write request referencing a logical block address that is the first logical block in the same SSD-block aligned group is received at the SSD, the controller is capable of:
 opening a new ongoing write session;
 assigning a new SSD block to the new session; and
 recording the logical block address and the newly assigned SSD block in the new session's data.

18. The SSD according to claim 14, wherein in case it is determined that the logical block address referenced in the incoming write request is not the first logical block in the respective SSD-block aligned group, and is not the successor of the current last-saved logical block address of the group, the controller is capable of:
 storing respective write data in a protected write buffer;
 acknowledging the write request; and
 determining, after a timeout period, whether the logical block address referenced in the write request that is associated with the write data that was stored in the protected write buffer is now the successor of the current latest-saved logical block address of the group.

19. The SSD according to claim 14, wherein in case the controller determines that the logical block address referenced in the incoming write request is not the first logical block in the respective SSD-block aligned group, and is not the successor of the current last-saved logical block address of the group, the controller is capable of storing respective write data in a SSD block that is reserved for out-of-sequence writes.

20. The SSD according to claim 14, wherein in case the controller determines that logical block address referenced in the incoming write request is mapped to one or more bad pages in the SSD-block assigned to the write session, the controller is capable of storing respective write data in a SSD block that is reserved for out-of-sequence writes.

21. The SSD according to claim 12, wherein the controller is further capable of recording in the session's data an offset parameter which indicates how many logical block addresses from the respective block aligned group were written so-far to the SSD block that was assigned to the session.

22. The SSD according to claim 21, wherein in case the logical block address referenced in the incoming write request is not the first logical block in the respective SSD-block aligned group, the controller is capable of determining whether the logical block address is a successor of a latest saved logical block address of the group, and if it is, the controller is capable of storing the write data in a SSD block that was assigned to the respective group, in sequence with a latest used segment of the SSD-block, and the controller is further capable of incrementing the offset parameter.

23. A program non-transitory storage device readable by machine, tangibly embodying a program of instructions executable by the machine to perform a method of managing a SSD, comprising:
 partitioning a logical block address space in alignment with the SSD's blocks, giving rise to a plurality of SSD-block aligned groups, each group comprises a specific sequence of logical block addresses;
 determining whether a logical block address referenced in an incoming write request is a first logical block in a respective SSD-block aligned group, and if so:
  opening an ongoing SSD-block aligned write session;
  assigning a SSD block to the session; and
  recording in the session's data an indication of which logical block address is associated with the write data that was saved to the SSD.

24. A computer program product comprising a computer useable non-transitory medium having computer readable program code embodied therein of managing a SSD, the computer program product comprising:
 computer readable program code for causing the computer to partition a logical block address space in alignment with the SSD's blocks, giving rise to a plurality of SSD-block aligned groups, each group comprises a specific sequence of logical block addresses;
 computer readable program code for causing the computer to:
 determine whether a logical block address referenced in an incoming write request is a first logical block in a respective SSD-block aligned group, and if so:
  to open an ongoing SSD-block aligned write session;
  to assign a SSD block to the session; and
  to record in the session's data an indication of which logical block address is associated with the write data that was saved to the SSD.

* * * * *